(12) United States Patent
Farooq et al.

(10) Patent No.: US 11,518,336 B2
(45) Date of Patent: Dec. 6, 2022

(54) BULKHEAD MOUNTED INFLATABLE DEVICE

(71) Applicant: Ford Global Technologies, LLC, Dearborn, MI (US)

(72) Inventors: S. M. Iskander Farooq, Novi, MI (US); Dean M. Jaradi, Macomb, MI (US); Mohammad Omar Faruque, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/226,368

(22) Filed: Apr. 9, 2021

(65) Prior Publication Data

US 2022/0324403 A1    Oct. 13, 2022

(51) Int. Cl.
*B60R 21/205* (2011.01)
*B60R 21/231* (2011.01)
*B60R 21/233* (2006.01)
*B60N 2/14* (2006.01)

(52) U.S. Cl.
CPC ............ *B60R 21/205* (2013.01); *B60N 2/143* (2013.01); *B60R 21/231* (2013.01); *B60R 21/233* (2013.01); *B60R 2021/23153* (2013.01); *B60R 2021/23308* (2013.01)

(58) Field of Classification Search
CPC ... B60R 21/205; B60R 21/231; B60R 21/233; B60R 2021/23308; B60R 2021/0004; B60R 2021/0011; B60R 2021/23153; B60R 2021/0006; B60R 2021/0009; B60N 2/14; B60N 2/143

USPC ............................ 280/732, 729, 730.1, 743.1
See application file for complete search history.

(56) References Cited

U.S. PATENT DOCUMENTS

| | | | |
|---|---|---|---|
| 5,486,019 A | 1/1996 | Chevroulet et al. | |
| 9,650,011 B1 | 5/2017 | Belwafa | |
| 10,471,919 B2 | 11/2019 | Faruque et al. | |
| 10,730,473 B2 | 8/2020 | Hayashi | |
| 10,864,882 B2 | 12/2020 | Obayashi et al. | |
| 11,066,038 B2 * | 7/2021 | Sekizuka | B60N 2/4221 |
| 2002/0063416 A1 * | 5/2002 | Kamaiji | B60R 21/231 |
| | | | 280/743.1 |

(Continued)

FOREIGN PATENT DOCUMENTS

DE                19533375 C2 *  6/1999  ......... B60R 21/0136

*Primary Examiner* — Keith J Frisby
(74) *Attorney, Agent, or Firm* — Frank A. MacKenzie; Bejin Bieneman PLC

(57) ABSTRACT

A vehicle includes a bulkhead and a seat rotatable to a vehicle-rearward facing direction. The seat includes a seatback having a first side, a second side spaced from the first side, and a rear side. The rear side faces the bulkhead in the away-facing direction. The vehicle includes an inflatable device that is a thermoplastic elastomer. The inflatable device has a middle chamber, a first side chamber, and a second side chamber. The middle chamber is inflatable away from the bulkhead toward the rear side of the seatback in the away-facing direction. The middle chamber is elongated cross-vehicle between the first side and the second side of the seatback. The first side chamber is inflatable vehicle-rearward from the bulkhead along the first side of the seatback in the away-facing position. The second side chamber is inflatable from the bulkhead along the second side of the seatback in the away-facing position.

18 Claims, 7 Drawing Sheets

(56) References Cited

U.S. PATENT DOCUMENTS

| | | |
|---|---|---|
| 2005/0029781 A1 | 2/2005 | Enders et al. |
| 2005/0184489 A1 | 8/2005 | Kobayashi |
| 2006/0055153 A1* | 3/2006 | Hirata ................ B60N 2/42709 |
| | | 280/728.1 |
| 2019/0016294 A1* | 1/2019 | Hayashi ................ B60R 21/233 |
| 2019/0118758 A1* | 4/2019 | Arima ................... B60R 21/233 |
| 2019/0291681 A1 | 9/2019 | Nakajima et al. |
| 2020/0317153 A1* | 10/2020 | Shen ................... B60R 21/2338 |
| 2021/0078517 A1* | 3/2021 | Fischer ............. B60R 21/01516 |
| 2022/0080921 A1* | 3/2022 | Jaradi ............. B60R 21/23138 |

* cited by examiner

BULKHEAD MOUNTED INFLATABLE DEVICE

BACKGROUND

A vehicle may include one or more inflatable devices, deployable during vehicle impacts to absorb energy from occupants of the vehicle during impact. The inflatable device may be a thermoplastic elastomer. The vehicle may include an inflation device in communication with the inflatable device for inflating the inflation device from an undeployed position to a deployed position.

DETAILED DESCRIPTION

Figure 1A:
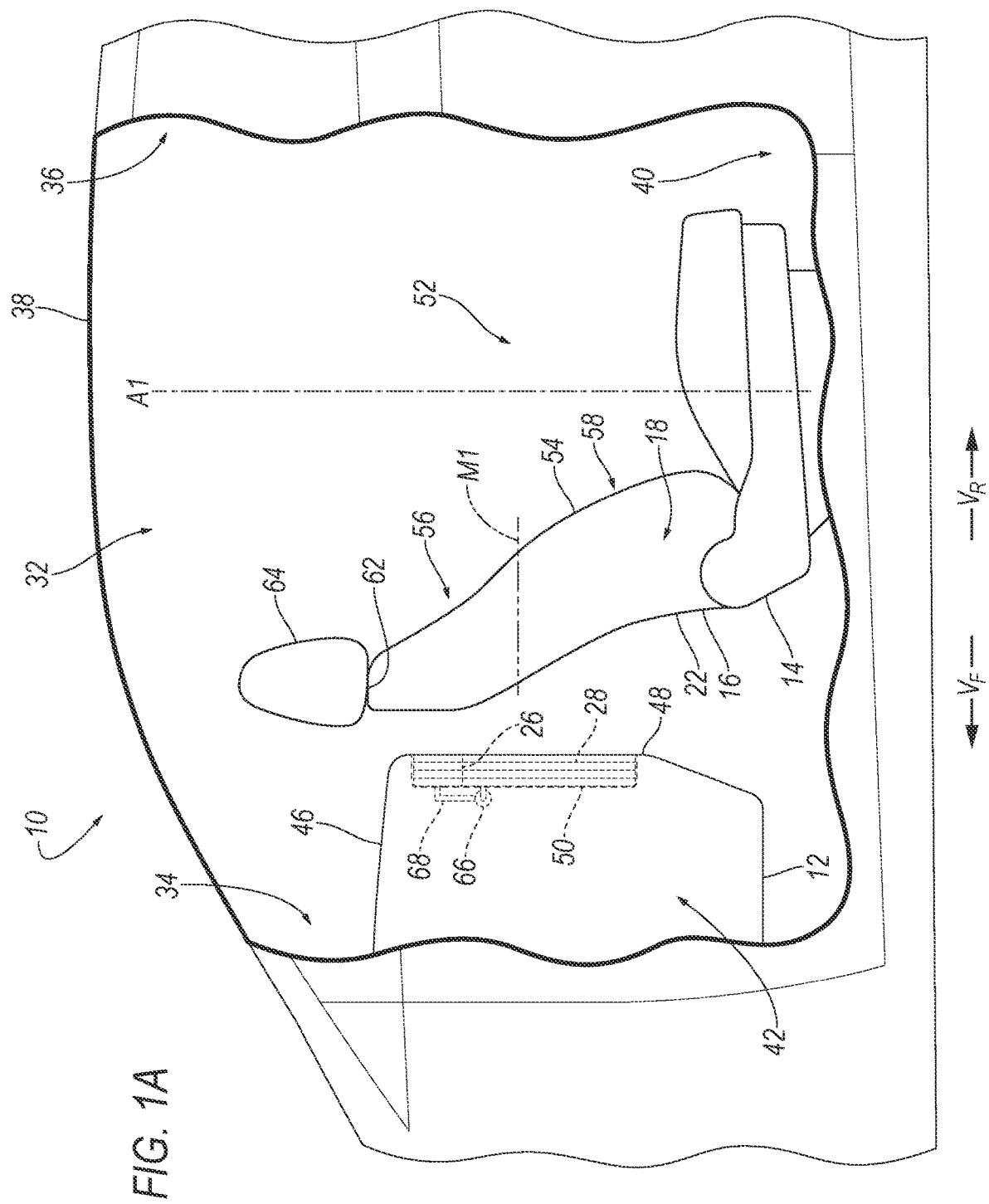
FIG. 1A is a side view of a vehicle including a seat with an inflatable device in an undeployed position.

A vehicle includes a bulkhead and a seat rotatable to a vehicle-rearward facing direction. The seat includes a seatback having a first side, a second side spaced from the first side, and a rear side. The rear side faces the bulkhead in the away-facing direction. The vehicle includes an inflatable device that is a thermoplastic elastomer. The inflatable device has a middle chamber, a first side chamber, and a second side chamber. The middle chamber is inflatable away from the bulkhead toward the rear side of the seatback in the away-facing direction. The middle chamber is elongated cross-vehicle between the first side and the second side of the seatback. The first side chamber is inflatable vehicle-rearward from the bulkhead along the first side of the seatback in the away-facing position. The second side chamber is inflatable from the bulkhead along the second side of the seatback in the away-facing position.

The middle chamber, the first side chamber, and the second side chamber may each include a base directly supported by the bulkhead.

The base of the middle chamber, the base of the first side chamber, and the base of the second side chamber may be arranged in a u-shape.

The first side chamber and the second side chamber may extend downwardly from the middle chamber in a deployed position.

The middle chamber may extend from a top face of the first side chamber to a top face of the second side chamber in the deployed position.

The seatback may have a top that is above the middle chamber, the first side chamber, and the second side chamber.

The vehicle may include a head restraint supported on the top.

The middle chamber, the first side chamber, and the second side chamber may each have a distal face, the distal face being distal relative to the bulkhead in the deployed position, the distal face of the first side chamber and the second side chamber being spaced from the bulkhead more than the distal face of the middle chamber is spaced from the bulkhead.

The seatback may have a horizontal midline and the first side chamber and the second side chamber extend downwardly to below the horizontal midline in a deployed position.

The middle chamber may be above the horizontal midline of the seatback.

The middle chamber, the first side chamber, and the second side chamber may be fluidly isolated from each other.

The middle chamber may extend from the first side chamber to the second side chamber in a deployed position.

The middle chamber may have a first terminal end and a second terminal end spaced from each other cross-vehicle, the first terminal end and the second terminal end being between the first side chamber and the second side chamber.

The head restraint may be supported on the seatback.

The seatback may define an occupant seating area between the first side and the second side, the first side chamber and the second side chamber in the deployed position being inflatable to extend along the occupant seating area when the seat is in the away-facing position.

The middle chamber, the first side chamber, and/or the second side chamber may each include a class-A surface.

With reference to the figures, where like numerals indicate like elements, a vehicle 10 includes a bulkhead 12 and a seat 14 rotatable to a vehicle-rearward facing direction. The seat 14 includes a seatback 16 having a first side 18, a second side 20 spaced from the first side 18, and a rear side 22 extending between the first side 18 and the second side 20. The rear side 22 faces the bulkhead 12 in the away-facing direction. The vehicle 10 includes an inflatable device 24 that is a thermoplastic elastomer. The inflatable device 24 has a middle chamber 26, a first side chamber 28, and a second side chamber 30. The inflatable device 24 is supported by the bulkhead 12. The middle chamber 26 is inflatable away from the bulkhead 12 toward the rear side 22 of the seatback 16 in the away-facing direction. The middle chamber 26 is elongated cross-vehicle between the first side 18 and the second side 20 of the seatback 16. The first side chamber 28 is inflatable vehicle-rearward from the bulkhead 12 along the first side 18 of the seatback 16 in the away-facing position. The second side chamber 30 is inflatable from the bulkhead 12 along the second side 20 of the seatback 16 in the away-facing position.

During a vehicle 10 impact, the inflatable device 24 is inflated away from the bulkhead 12 from an undeployed position to a deployed position. Since the middle chamber 26 is elongated cross-vehicle between the first side 18 and the second side 20 of the seatback 16, the middle chamber 26 can control the kinematics of the seatback 16 during impact. As one example, in a frontal impact with the seat 14 facing vehicle-rearward, the seatback 16 and the occupant are urged vehicle-forward and the inflatable device 24 acts against the vehicle-forward movement of the seat 14. The inflatable device 24 can control the kinematics of the occupant during impact with the first and second side chambers 28, 30. Specifically, since the first side chamber 28 and the second side chamber 30 extend from the bulkhead 12 along the sides of the seatback 16, the first side chamber 28 and the second side chamber 30 can control the occupant kinematics. As an example, in a side impact, the occupant is urged cross-vehicle and the inflatable device 24 controls the occupant kinematics. Because the inflatable device 24 can control occupant kinematics for an occupant during multiple collision types, the inflatable device 24 can eliminate the need for additional passive restraints, e.g., airbags. The inflatable device 24 being a thermoplastic elastomer aids in the deployment characteristics and the shape and size of the inflatable device 24 in the deployed position. The inflatable device 24 being a thermoplastic elastomer may aid in packaging of the inflatable device 24, as described further below.

The vehicle 10 may be any suitable type of ground vehicle, e.g., a passenger or commercial automobile such as a sedan, a coupe, a truck, a sport utility, a crossover, a van, a minivan, a taxi, a bus, etc. The vehicle 10 may be an autonomous vehicle. For the purposes of this disclosure, autonomous operation means that the vehicle 10 may be driven without constant attention from a driver, i.e., the vehicle 10 may be self-driving without human input.

The vehicle 10 may include two sides (not numbered) spaced from each other in the cross-vehicle direction. The sides of the vehicle 10 may be elongated in the vehicle 10 fore-and-aft direction. Each side of the vehicle 10 may be similar or identical to each other.

The vehicle 10 may include a vehicle body (not numbered). The vehicle body defines a passenger cabin 32 to house occupants, if any, of the vehicle 10. The passenger cabin 32 may extend across the vehicle 10, i.e., from one side to the other side of the vehicle 10. The passenger cabin 32 includes a front end 34 and a rear end 36 with the front end 34 being in front of the rear end 36 during forward movement of the vehicle 10.

The vehicle body may include a roof 38, a floor 40 spaced from the roof 38, and pillars extending downwardly from the roof 38, i.e., generally towards the floor 40. The roof 38 and the floor 40 may each extend across the passenger cabin 32, i.e., from one side to the other side of the vehicle 10. The roof 38 may define an upper boundary of the passenger cabin 32 and the floor 40 may define a lower boundary of the passenger cabin 32.

The vehicle 10 may include at least one bulkhead 12. In the example shown in the figures, the vehicle 10 includes one bulkhead 12 disposed at the front end 34 of the passenger cabin 32. In addition or in the alternative, the vehicle 10 may include another bulkhead 12 at the rear end 36 of the passenger cabin 32, as described further below.

The bulkhead 12 may extend across the front end 34 of the passenger cabin 32 from one side of the vehicle 10 to the other side of the vehicle 10. In the example shown in FIG. 3, the bulkhead 12 includes a first end 42 and a second end 44 spaced from the first end 42. The bulkhead 12 may be elongated cross-vehicle from the first end 42 of the bulkhead 12 to the second end 44 of the bulkhead 12.

The bulkhead 12 may have a top 46 and a face 48. The face 48 extends from the top 46 toward the floor 40. The bulkhead 12 may, for example, be generally flat in the cross-vehicle direction. In other words, the bulkhead 12 may be generally planar. Specifically, the face 48 may be generally flat.

As an example, as shown in the Figures, the bulkhead 12 may be at the front of the vehicle 10. In this example, the top 46 may extend from the windshield to the face 48 in a vehicle-rearward direction. As another example, not shown in the Figures, the bulkhead 12 may be at the rear of the vehicle 10. In this example the top 46 may extend from the rear end 36 of the passenger cabin 32 to the face 48 in a vehicle-forward direction.

The bulkhead 12 may include vehicle controls, such as gauges, dials, screens, and information displays; heating and ventilation equipment; a radio and other electronics; etc. In other words, the bulkhead 12 may be referred to as an instrument panel. The bulkhead 12, as well as the rest of the vehicle 10, may lack a steering wheel and may lack pedals for accelerating and braking. In other words, no steering wheel or pedals for accelerating and braking are supported by or adjacent to the bulkhead 12. More specifically, in such an example, the vehicle 10 does not include a steering wheel or pedals for accelerating and braking, e.g., in an autonomous vehicle.

The bulkhead 12 may include at least one recess 50. The recess 50 is designed, i.e., sized and positioned, to receive and support the inflatable device 24, as set forth further below. The recess 50 may be disposed at any suitable position on the bulkhead 12, e.g., on the face 48 between the floor 40 and the top 46. The bulkhead 12 may include any suitable number of recesses 50.

As an example, as shown in the Figures, the recess 50 may be U-shaped. In such an example, the three legs of the U-shape house the middle chamber 26, first side chamber 28, and second side chamber 30, respectively. In another example, the bulkhead 12 may include a separate recess 50 for each chamber of the inflatable device 24.

The vehicle 10 includes one or more seats 14. As shown in the Figures, the seats 14 are positioned in the passenger cabin 32. The seats 14 may be arranged in the passenger cabin 32 in any suitable position, i.e., as front seats, rear seats, third-row seats, etc. The seats 14 may be movable relative to the floor 40 to various positions, e.g., movable fore-and-aft and/or cross-vehicle. The seats 14 may be of any suitable type, e.g., a bucket seat as shown in the Figures.

Each seat 14 may rotate about a vertical axis $\mu l$ that extends through the floor 40 and the roof 38, if any, of the vehicle 10. For example, the seat 14 may rotate between a forward-facing position, a rearward-facing position, a rightward-facing position, a leftward-facing position, and/or positions therebetween. As shown in the figures, the front seats 14 are in the rearward-facing position. In other words, an occupant of the seat 14 faces the rear end 36 of the passenger cabin 32. The seat 14 may rotate completely, i.e., 360°, about the vertical axis $\mu l$. The seat 14 may rotate between fixed positions, e.g., the forward-facing position and the rearward-facing position, or may be rotatable to an infinite number of positions.

The seat 14 may rotate to positions relative to other vehicle components. As an example, the seat 14 may rotate to a position relative to the bulkhead 12. As an example, shown in the Figures, the seat 14 may rotate to an away-facing position. Specifically, in the away-facing position the rear side 22 of the seatback 16 is between the bulkhead 12 and an occupant seating area 52, as described below. In this example, the seat 14 is in the rearward-facing position and in the away-facing position. In other words, the seat 14 is in the rearward-facing position relative to the vehicle 10 and the away-facing position relative to the bulkhead 12. In another example the seat 14 may be a rear seat and the vehicle 10 includes the bulkhead 12 at the rear end 36 of the passenger cabin 32. In this example, the seat 14 is in the forward-facing position and the away-facing position. In other words, the seat 14 is in the forward-facing position relative to the vehicle 10 and the away-facing position relative to the bulkhead 12.

The seat 14 includes the seatback 16 and a seat bottom (not numbered). The seatback 16 may be supported by the seat bottom and may be stationary or movable relative to the seat bottom. The seatback 16 and the seat bottom may be adjustable in multiple degrees of freedom. Specifically, the seatback 16 and the seat bottom may themselves be adjustable, in other words, adjustable components within the seatback 16 and/or the seat bottom, and/or may be adjustable relative to each other.

The seatback 16 includes the first side 18, the second side 20, a front 54 extending between the first side 18 and the second side 20, and the rear side 22 extending between the first side 18 to the second side 20. As shown in FIG. 1A-2B, when the seat 14 is in the rearward facing position, the rear side 22 of the seatback 16 faces vehicle-forward and the front 54 of the seatback 16 faces vehicle-rearward.

The seatback 16 has a horizontal midline M1. The horizontal midline M1 extends from the first side 18 to the second side 20. The seatback 16 includes an upper portion 56 above the midline and a lower portion 58 below the midline.

The seat 14 defines the occupant seating area 52. Specifically, the seatback 16 defines the occupant seating area 52 between the first side 18 and the second side 20. The front 54 of the seatback 16 between the first side 18 and the second side 20 defines the occupant seating area 52. The occupant seating area 52 is the area occupied by an occupant when properly seated on the seat bottom. In the away-facing position, the rear side 22 is between the bulkhead 12 and the occupant seating area 52.

The seatback 16 and the seat bottom may each include a frame (not numbered) and a covering (not numbered) supported on the frame. The frame may be of any suitable plastic material, e.g., carbon fiber reinforced plastic (CFRP), glass fiber-reinforced semi-finished thermoplastic composite (organosheet), etc.; any suitable metal such as steel, aluminum, etc.; etc. The covering may include upholstery and padding. The upholstery may be cloth, leather, faux leather, or any other suitable material. The upholstery may be stitched in panels around the frame. The padding may be between the covering and the frame and may be foam or any other suitable material.

The seatback 16 may have bolsters 60a, 60b on opposite sides of the occupant seating area 52. The bolsters 60a, 60b are elongated, and specifically, are elongated in a generally upright direction when the seatback 16 is in a generally upright position. The bolsters 60a, 60b define cross-seat boundaries of the seatback 16, i.e., the seatback 16 terminates at the bolsters 60a, 60b. The bolsters 60a, 60b may extend in a seat-forward direction relative to the occupant seating area 52, i.e., on opposite sides of the torso and shoulders of an occupant seated on the seat assembly. The extension of the bolsters 60a, 60b relative to the occupant seating area 52 may be defined by the seatback 16 frame or the covering.

The seatback 16 has a top 62 between the first side 18 and the second side 20. Specifically, the top 62 may extend between the bolsters 60a, 60b. In other words, as shown in the Figures, the top 62 may terminate at the bolsters 60a, 60b.

The seat 14 may include a head restraint 64. As an example, as shown in the Figures, the head restraint 64 may be supported on the seatback 16. Specifically, the head restraint 64 may be supported on the top 62.

The vehicle 10 includes at least one inflatable device 24. One example of the inflatable device 24 is shown in the Figures. As an example, the vehicle 10 may include one inflatable device 24 for each seat 14 located adjacent the bulkhead 12. As set forth above, in one example, the vehicle 10 may include one bulkhead 12 at the front end 34 of the passenger cabin 32 and one bulkhead 12 at the rear end 36 of the passenger cabin 32 and, in such an example, both bulkheads 12 may include one or more inflatable devices 24, i.e., one for each adjacent seat 14. In examples including more than one inflatable device 24, each of the inflatable devices 24 may be identical.

Figure 5:
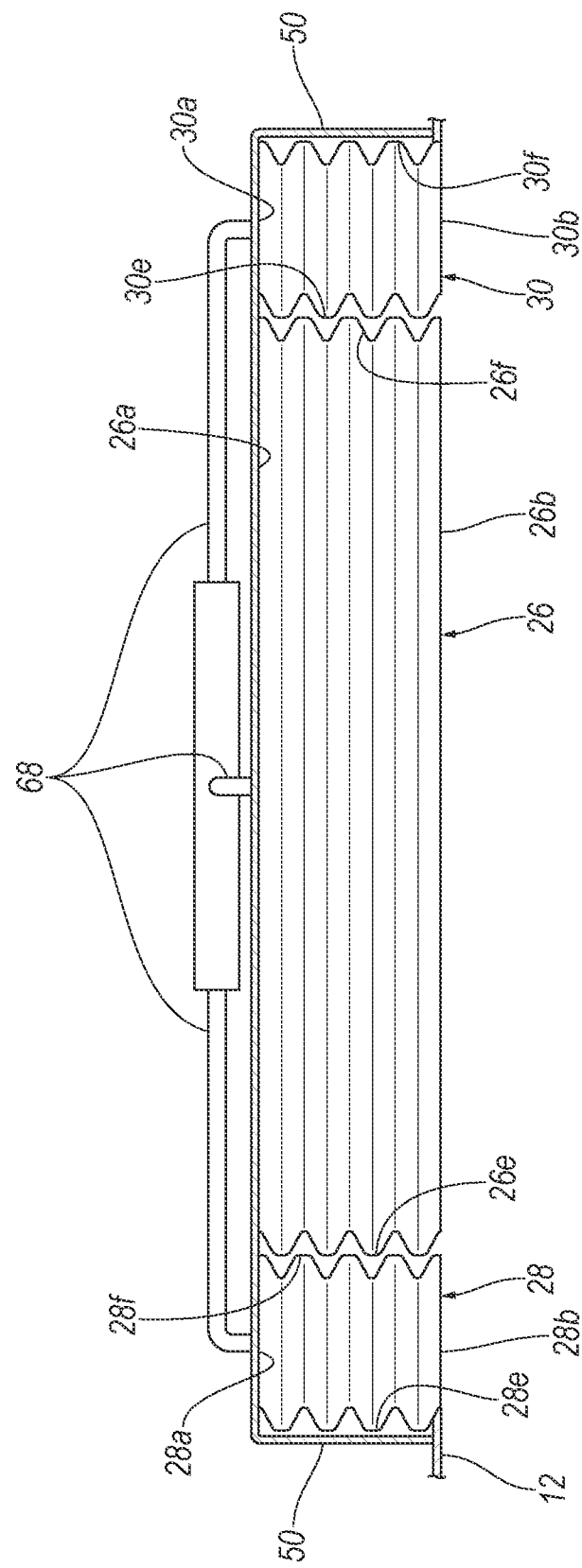
FIG. 5 is a top view of the inflatable device in the undeployed position.

The inflatable device 24 may include an inflator 66 in fluid communication with the inflation chambers. Specifically, as shown in FIG. 5, the inflator 66 may include fill tubes 68 in fluid communication with the inflation chambers. As an example, the inflator 66 may include a manifold (not shown) connected to the fill tubes 68 to control the release of the inflation medium. The inflator 66 inflates the inflation chambers with inflation medium, such as a gas, to move the inflatable device 24 from an undeployed position to the deployed position. The inflator 66 may be, for example, a pyrotechnic inflator that ignites a chemical reaction to generate the inflation medium, a stored gas inflator that releases (e.g., by a pyrotechnic valve) stored gas as the inflation medium, or a hybrid.

The inflatable device 24 defines at least one inflation chamber. Specifically, as set forth above, the inflatable device 24 includes the middle chamber 26, the first side chamber 28, and the second side chamber 30. The chambers of the inflatable device 24 may be fluidly isolated from each other. As an example, shown in the Figures, the middle chamber 26, the first side chamber 28, and the second side chamber 30 are fluidly isolated from each other. In other words, the inflation medium from the inflator 66 may not pass between the inflation chambers when one or more inflation chambers is in the deployed position. As another example, any one of the chambers may be in fluid communication with each other. In such an example, fluidly connected chambers may inflate simultaneously by the inflator 66.

The inflatable device 24 is a thermoplastic elastomer (TPE). Specifically, the inflatable device 24 has sides that are thermoplastic elastomer. The sides of the inflatable device 24 define the inflation chambers, as described below. A thermoplastic elastomer has both thermoplastic and elastomeric properties. The inflatable device 24 may be of any suitable TPE, e.g., styrenic block copolymers, thermoplastic olefins, elastomeric alloys, thermoplastic polyurethanes, thermoplastic copolyesters, and thermoplastic polyamides. The sides of the inflatable device 24 are solid, i.e., not woven, fabric, etc. The inflatable device 24 may be formed using any suitable manufacturing process, e.g., injection molding, blow molding, ultrasonic welding, etc. A TPE may be manufactured with a class-A surface, e.g., the TPE may be textured in the molding process to match another class-A surface in the vehicle 10. In other words, when the inflatable device 24 is a TPE, the inflatable device 24 can be integrated into vehicle components without an additional covering.

The chambers of the inflatable device 24 may include a base 26a, 28a, 30a and a distal face 26b, 28b, 30b spaced from the base on the fore-aft axis. The chambers of the inflatable device 24 may include a top face 26c, 28c, 30c and a bottom face 26d, 28d, 30d spaced from the top face 26c, 28c, 30c. As an example, shown in the Figures, the top face 26c, 28c, 30c and the bottom face 26d, 28d, 30d are elongated from the base 26a, 28a, 30a to the distal face 26b, 28b, 30b in the deployed position. The chambers of the inflatable device 24 may include a first side face 26e, 28e, 30e and a second side face 26f, 28f, 30f spaced from the first side face 26e, 28e, 30e. As shown in the Figures, the first side face 26e, 28e, 30e and the second side face 26f, 28f, 30f in the deployed position may extend between the base 26a, 28a, 30a and the distal face 26b, 28b, 30b and between the top face 26c, 28c, 30c and the bottom face 26d, 28d, 30d.

The inflatable device 24 is supported by the bulkhead 12. The base 26a, 28a, 30a of the chambers 26, 28, 30 may be supported on the bulkhead 12. Specifically, as shown in the Figures, the base 26a, 28a, 30a may be directly supported by the bulkhead 12. In other words, the base 26a, 28a, 30a is supported by the bulkhead 12 with no intermediate component in between. The base 26a, 28a, 30a may be supported by the bulkhead 12 by any suitable means, e.g., fasteners, welding, etc. In other examples not shown in the Figures, the base 26a, 28a, 30a may be indirectly supported by the bulkhead 12, i.e., the base 26a, 28a, 30a is supported on an intermediate component, the intermediate component being supported by the bulkhead 12.

Figure 2A:
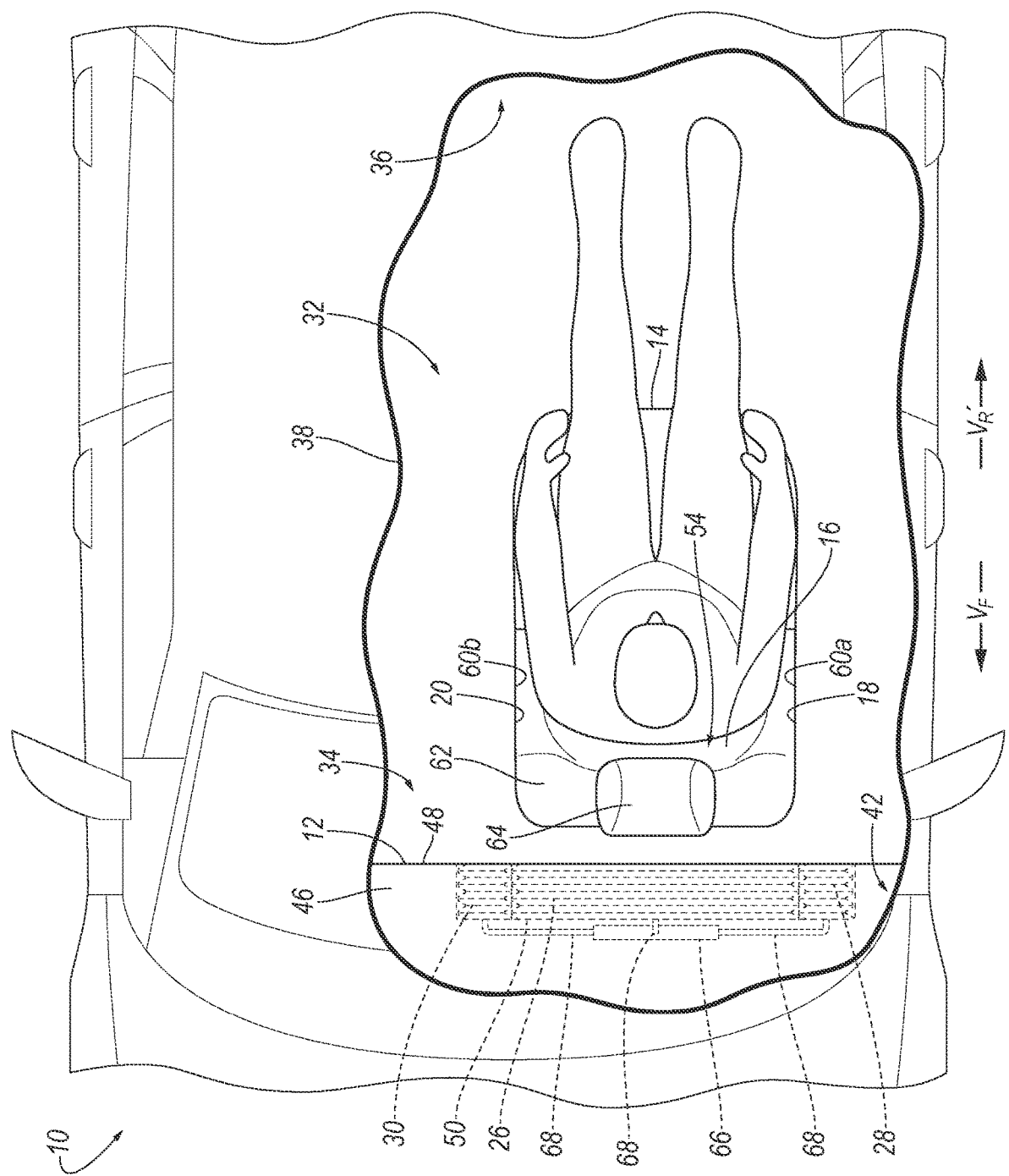
FIG. 2A is a top view of the vehicle including the seat with the inflatable device in the undeployed position.
Figure 2B:
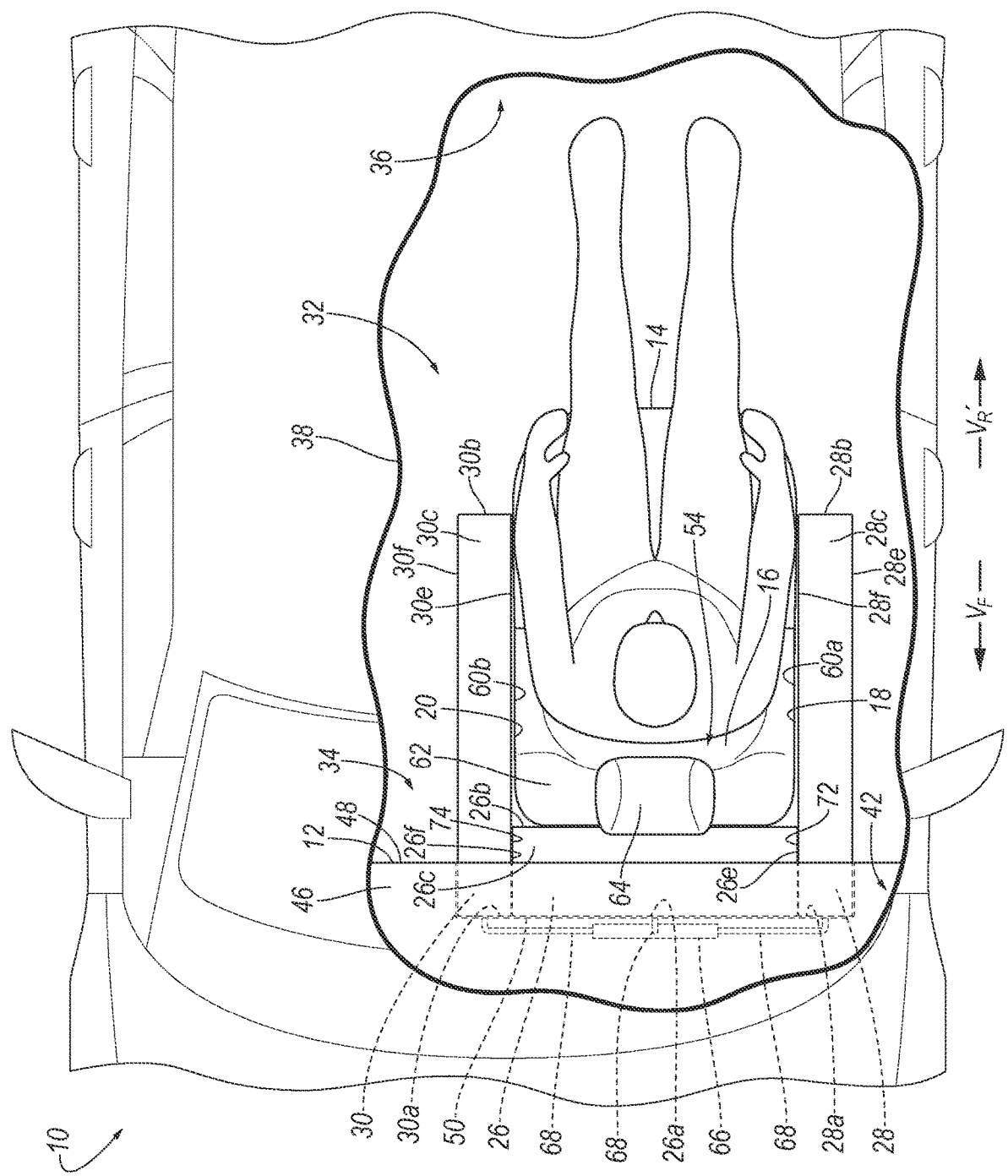
FIG. 2B is a top view of the vehicle including the seat with the inflatable device in the deployed position.
Figure 4:
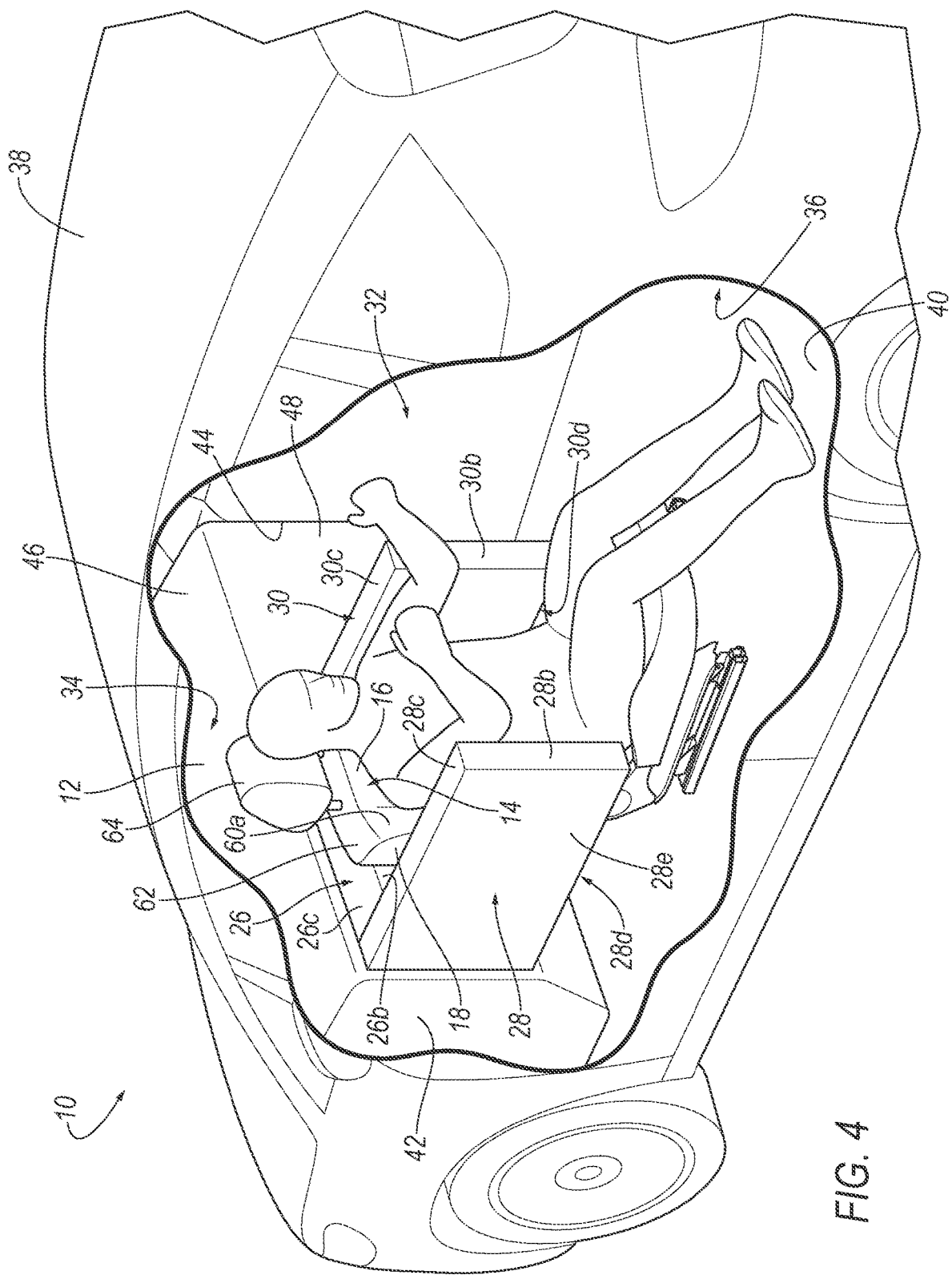
FIG. 4 is a perspective view of the vehicle including the seat with the inflatable device in the deployed position.

As shown in the Figures, the base 26a of the middle chamber 26, the base 28a of the first side chamber 28, and the base 30a of the second side chamber 30 may be arranged in a U-shape. The middle chamber 26 is elongated between the first side 18 and the second side 20 of the seatback 16. Specifically, the middle chamber 26 is elongated cross-vehicle between the first side 18 and the second side 20 of the seatback 16. As an example, as shown in FIGS. 2B and 4, the middle chamber 26 extends from the first side chamber 28 to the second side chamber 30 in the deployed position. As shown in the Figures, the first side chamber 28 and the second side chamber 30 may extend downwardly. Specifically, in the undeployed position the first side chamber 28 and the second side chamber 30 may extend downwardly from their top faces 28c, 30c. In other words, the first side chamber 28 and the second side chamber 30 may each extend downwardly from the middle chamber 26 in the undeployed position.

The middle chamber 26, the first side chamber 28, and the second side chamber 30 may each include the distal face 26b, 28b, 30b. Specifically, the distal face 26b, 28b, 30b of the middle chamber 26, the first side chamber 28, and the second side chamber 30, is distal-most relative to the bulkhead 12 in the deployed position. In the deployed position, the distal face 28b, 30b of the first side chamber 28 and the second side chamber 30 are spaced from the bulkhead 12 more than the distal face 26b of the middle chamber 26 is spaced from the bulkhead 12. In other words, the distal face 28b, 30b of the first side chamber 28 and the second side chamber 30 each extend from the bulkhead 12 beyond the distal face 26b of the middle chamber 26. Accordingly, the first side chamber 28 and the second side chamber 30 extend along the bolsters 60a, 60b of the seat 14 outboard of the bolsters 60a, 60b.

In the examples shown in the Figures, the middle chamber 26, the first side chamber 28, and the second side chamber 30 each have a distal face 26b, 28b, 30b vehicle rearward of the bulkhead 12 in the deployed position. In these examples, the distal face 28b, 30b of the first side chamber 28 and the second side chamber 30 are vehicle-rearward of the distal face 26b of the middle chamber 26.

Figure 3:
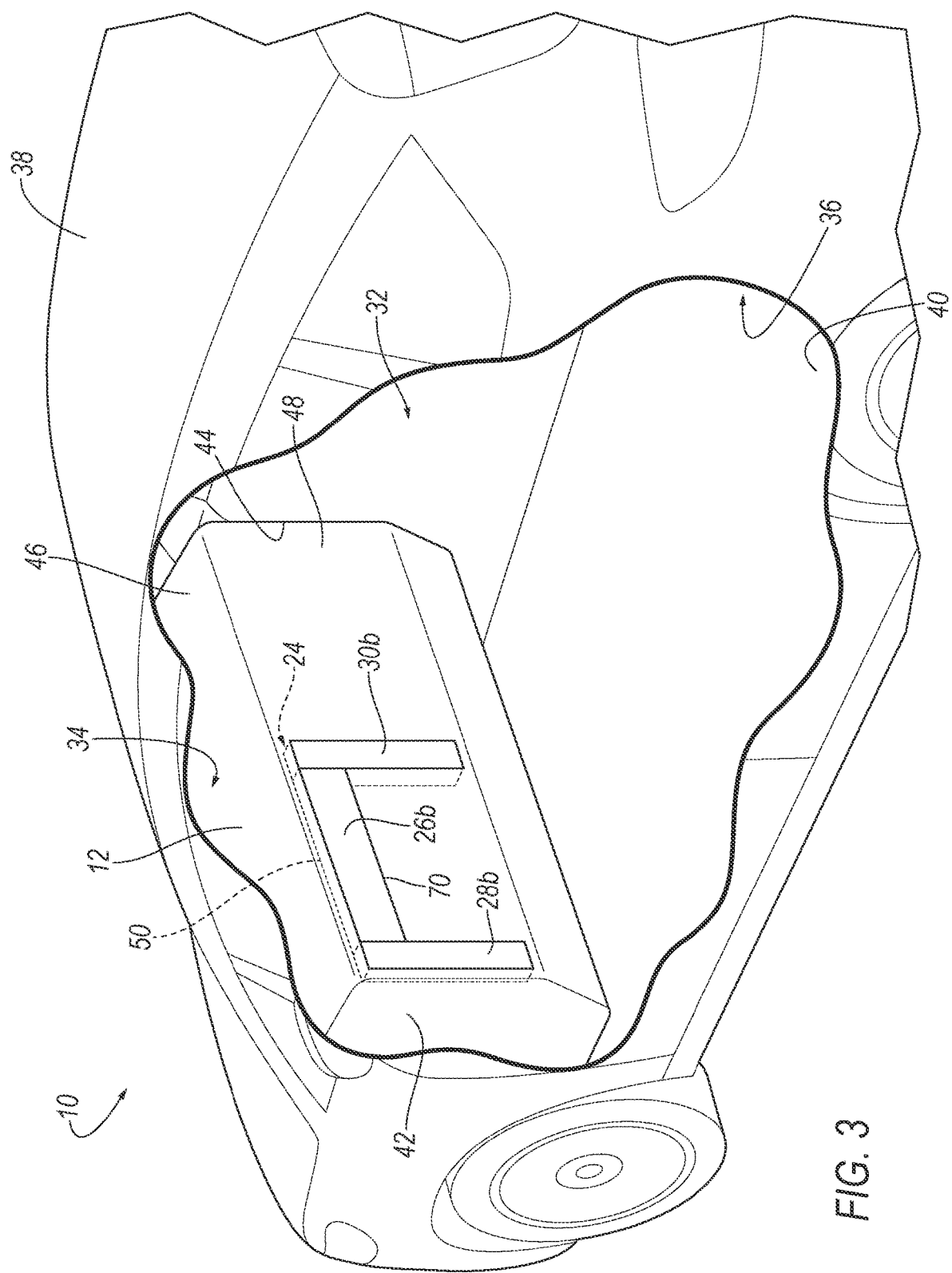
FIG. 3 is a perspective view of the vehicle including the bulkhead with the inflatable device in the undeployed position.

The bulkhead 12 may include a class-A surface. As used in this disclosure, a class-A surface is a finished surface exposed to view by a customer and free of unaesthetic blemishes and defects. Specifically, the top 46 and the face 48 may have a class-A surface. The distal face 26b, 28b, 30b of the chambers 26, 28, 30 may be a class-A surface. As an example, shown in FIGS. 1A and 3, the distal face 26b, 28b, 30b is flush with the bulkhead 12 in the undeployed position, i.e., the distal face 26b, 28b, 30b is not protruding or recessed from the face 48 of the bulkhead 12 in the undeployed position. Specifically, the distal face 26b, 28b, 30b and the bulkhead 12 may share a class-A surface, i.e., in the undeployed position an occupant cannot identify a difference between the bulkhead 12 and the distal face 26b, 28b, 30b based on the class-A surface. Tear seams 70 may connect the distal faces 26b, 28b, 30b to the bulkhead 12, as shown in FIGS. 2A, 3, and 5. The tear seam 70 is designed to rupture upon inflation of the inflatable device 24, i.e., is positioned, sized, has a rupture strength, etc., so that the inflatable device 24 breaks the tear seam 70 when the inflatable device 24 is inflated. The tear seam 70 may be weaker than a portion of the bulkhead 12 adjacent the tear seam 70, e.g., the tear seam 70 may be relatively thinner, a relatively weaker material, etc.

The middle chamber 26 is inflatable from the bulkhead 12 toward the rear side 22 of the seatback 16 when the seat 14 is away-facing. In the example where the seat 14 is in the vehicle-rearward facing direction, as shown in the Figures, the middle chamber 26 is inflatable vehicle-rearward from the bulkhead 12. Specifically, during a frontal impact when the inflatable device 24 inflates to the deployed position, the distal face 26b of the middle chamber 26 is nearer the seatback 16 than the bulkhead 12 in the deployed position. As one example, the distal face 26b of the middle chamber 26 may be in direct contact with the seatback 16 in the deployed position. In other words, the distal face 26b of the middle chamber 26 acts as a reaction surface for the seatback 16 in the deployed position.

The middle chamber 26 may have a first terminal end 72 and a second terminal end 74. The first terminal end 72 and the second terminal end 74 are spaced from each other in the cross-vehicle direction. As an example, the first terminal end 72 and the second terminal end 74 of the middle chamber 26 are defined by the first side face 26e and the second side face 26f of the middle chamber 26. As shown in FIGS. 2B and 3, the first terminal end 72 and the second terminal end 74 may be between the first side chamber 28 and the second side chamber 30. Specifically, the first terminal end 72 may abut the first side chamber 28 and the second terminal end 74 may abut the second side chamber 30.

Figure 1B:
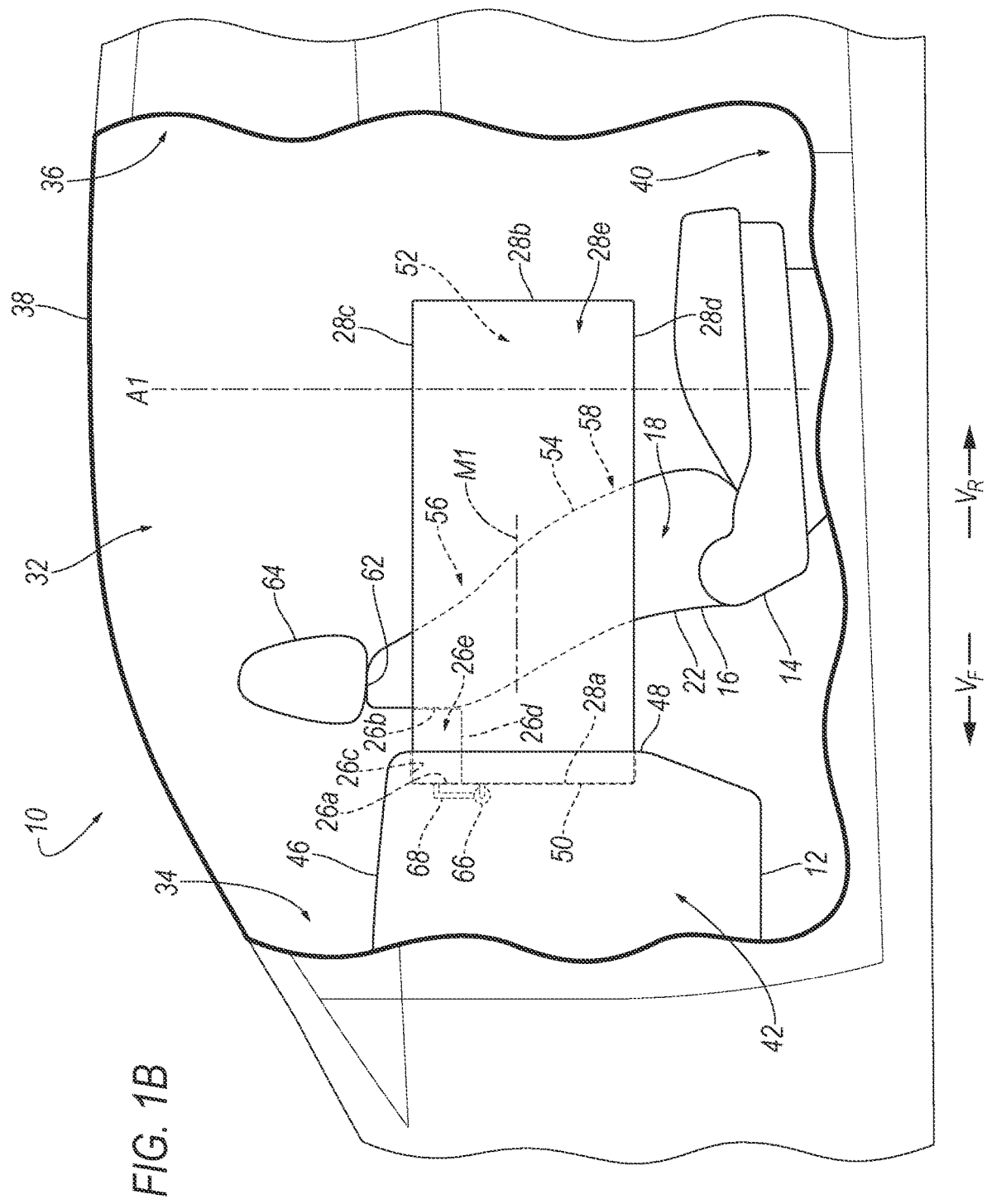
FIG. 1B is a side view of the vehicle including the seat with the inflatable device in a deployed position.

The middle chamber 26 may be above the horizontal midline M1 of the seatback 16. As shown in the Figures, the middle chamber 26 is supported on the bulkhead 12 above the midline of the seatback 16. Specifically, the bottom face 26d of the middle chamber 26 may be above the horizontal midline M1. As an example, as shown in FIG. 1B, in the deployed position the middle chamber 26 is in contact with the upper portion 56 of the seatback 16.

The middle chamber 26 may extend from the top face 28c of the first side chamber 28 to the top face 30c of the second side chamber 30 in the deployed position. As shown in the Figures, the top face 26c of the middle chamber 26 may extend from the top face 28c of the first side chamber 28 to the top face 30c of the second side chamber 30 in the deployed position. In other words, the top face 26c of the middle chamber 26 is aligned with the top face 28c of the first side chamber 28 and the top face 30c of the second side chamber 30.

As shown in the Figures, the first side chamber 28 is inflatable from the bulkhead 12 along the first side 18 of the seatback 16 in the away-facing position. Specifically, the first side chamber 28 may be inflatable from the base 28a. As shown in the Figures, the second side chamber 30 is inflatable from the bulkhead 12 along the second side 20 of the seatback 16 in the away-facing position. Specifically, the second side chamber 30 may be inflatable from the base 30a.

In the examples shown in the Figures, the first side chamber 28 and the second side chamber 30 in the deployed position may extend from the bulkhead 12 along the occupant seating area 52. Specifically, in the deployed position the seatback 16 may be between the distal face 28b, 30b of the first side chamber 28 and the second side chamber 30 and the bulkhead 12. In other words, when the seat 14 is in the away-facing position, the first side chamber 28 and the second side chamber 30 may extend from the bulkhead 12 past the first bolster 60a and the second bolster 60b along the occupant seating area 52 in the deployed position.

As discussed above, the inflatable device 24 is a TPE. In the deployed position, the size and shape of the inflatable device 24 is controlled by the manufacturing of the TPE. The size and shape of the inflatable device 24 may be controlled for the inflatable device 24 to fit between vehicle components in the deployed position. As an example, where the first side chamber 28 extends from the bulkhead 12 past the first bolster 60a, the inflatable device 24 may be manufactured, i.e., sized and shaped, to fit between the first bolster 60a and the side of the passenger cabin 32 32, e.g., a door.

In the examples shown in the Figures, the first side chamber 28 and the second side chamber 30 may extend to below the horizontal midline M1 in the deployed position. Specifically, in the deployed position the first side chamber 28 and the second side chamber 30 may extend downwardly from their top faces 28c, 30c to below the horizontal midline M1. In other words, the first side chamber 28 and the second side chamber 30 may each extend downwardly from the middle chamber 26 to below the horizontal midline M1 in the deployed position. The top faces 26c, 28c, 30c of the first side chamber 28, the second side chamber 30, and the middle chamber 26 may be above the horizontal midline M1.

As shown in the Figures, the top 62 of the seatback 16 may be above the middle chamber 26, the first side chamber 28, and the second side chamber 30. Specifically, the top faces 26c, 28c, 30c of the middle chamber 26, the first side chamber 28, and the second side chamber 30, may be between the top of the seatback 16 and the horizontal midline M1.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A vehicle comprising:
   a bulkhead;
   a seat rotatable to an away-facing position relative to the bulkhead;
   the seat including a seatback having a first side, a second side spaced from the first side, and a rear side extending between the first side and the second side, the rear side facing the bulkhead in the away-facing position;
   an inflatable device that is a thermoplastic elastomer;
   the inflatable device having a middle chamber, a first side chamber, and a second side chamber, the inflatable device supported by the bulkhead;
   the middle chamber inflatable from the bulkhead toward the rear side of the seatback in the vehicle-rearward facing direction and elongated cross-vehicle between the first side and the second side of the seatback; and
   the first side chamber inflatable from the bulkhead along the first side of the seatback and the second side chamber inflatable from the bulkhead along the second side of the seatback in the away-facing position.

2. The vehicle as set forth in claim 1, wherein the middle chamber, the first side chamber, and the second side chamber each include a base directly supported by the bulkhead.

3. The vehicle as set forth in claim 2, wherein the base of the middle chamber, the base of the first side chamber, and the base of the second side chamber are arranged in a u-shape.

4. The vehicle as set forth in claim 1, wherein the first side chamber and the second side chamber extend downwardly from the middle chamber in a deployed position.

5. The vehicle as set forth in claim 4, wherein the middle chamber extends from a top face of the first side chamber to a top face of the second side chamber in the deployed position.

6. The vehicle as set forth in claim 5, wherein the seatback has a top that is above the middle chamber, the first side chamber, and the second side chamber.

7. The vehicle as set forth in claim 6, further comprising a head restraint supported on the top.

8. The vehicle as set forth in claim 1, wherein the middle chamber, the first side chamber, and the second side chamber each have a distal face, the distal face being distal relative to the bulkhead in the deployed position, the distal face of the first side chamber and the second side chamber being spaced from the bulkhead more than the distal face of the middle chamber is spaced from the bulkhead.

9. The vehicle as set forth in claim 1, wherein the seatback has a horizontal midline and the first side chamber and the second side chamber extend downwardly to below the horizontal midline in a deployed position.

10. The vehicle as set forth in claim 9, wherein the middle chamber is above the horizontal midline of the seatback.

11. The vehicle as set forth in claim 1, wherein the middle chamber, the first side chamber, and the second side chamber are fluidly isolated from each other.

12. The vehicle as set forth in claim 1, wherein the middle chamber extends from the first side chamber to the second side chamber in a deployed position.

13. The vehicle as set forth in claim 1, wherein the middle chamber has a first terminal end and a second terminal end spaced from each other cross-vehicle, the first terminal end and the second terminal end being between the first side chamber and the second side chamber.

14. The vehicle as set forth in claim 1, wherein the seatback has a top above the middle chamber, the first side chamber, and the second side chamber.

15. The vehicle as set forth in claim 14, further comprising a head restraint, the head restraint supported on the top.

16. The vehicle as set forth in claim 1, further comprising a head restraint supported on the seatback.

17. The vehicle as set forth in claim 1, wherein the seatback defines an occupant seating area between the first side and the second side, the first side chamber and the second side chamber in the deployed position being inflatable to extend along the occupant seating area when the seat is in the away-facing position.

18. The vehicle as set forth in claim 1, wherein the middle chamber, the first side chamber, and/or the second side chamber includes a class A-surface.

\* \* \* \* \*